April 25, 1950 I. F. RANKIN 2,505,341

PERPETUAL CALENDAR

Filed May 5, 1947 4 Sheets-Sheet 1

INVENTOR.
IRA F RANKIN
BY
[signature]
ATTORNEY

April 25, 1950 | I. F. RANKIN | 2,505,341

PERPETUAL CALENDAR

Filed May 5, 1947 | 4 Sheets-Sheet 2

INVENTOR.

IRA F RANKIN

BY F. R. Geisler.

ATTORNEY

April 25, 1950 I. F. RANKIN 2,505,341

PERPETUAL CALENDAR

Filed May 5, 1947 4 Sheets-Sheet 3

INVENTOR.
IRA. F RANKIN
BY
[signature]
ATTORNEY

April 25, 1950 I. F. RANKIN 2,505,341

PERPETUAL CALENDAR

Filed May 5, 1947 4 Sheets-Sheet 4

INVENTOR.
IRA F RANKIN
BY
ATTORNEY

Patented Apr. 25, 1950 2,505,341

UNITED STATES PATENT OFFICE 2,505,341

PERPETUAL CALENDAR

Ira F. Rankin, Vancouver, Wash.

Application May 5, 1947, Serial No. 745,912

2 Claims. (Cl. 40—117)

This invention relates in general to perpetual calendars, and, more specifically, to reference calendars by means of which a calendar for any month of any year, either past or future, can be readily obtained. In addition, this invention relates to calendars in which the date of Easter and the dates of the New Moon can be ascertained for any year, past or future.

An object of this invention is to provide a device by which the day of the week of any date desired can be quickly and easily ascertained, and thus to provide a device designed to be of practical service in court rooms and in all places where legal or historical research might be in need of such information.

Another object of this invention is to provide a calendar of the type above indicated which will be very simple to operate or adjust, requiring but little mental effort in making such adjustments, so that even a child can arrange the calendar as desired or obtain the information sought.

A further object of this invention is to provide a calendar, which, in addition to being so arranged as to furnish such information readily, as and when desired, will also serve as an ordinary calendar for the current month in any year.

An additional object is to provide a calendar meeting the above and other requirements which will be simple and practical in construction and easy and inexpensive to manufacture.

These objects and incidental advantages I attain by constructing and arranging the cooperating elements of my improved calendar as hereinafter briefly described. In the following explanation and description reference is made to the accompanying drawings in which.

Figure 1:
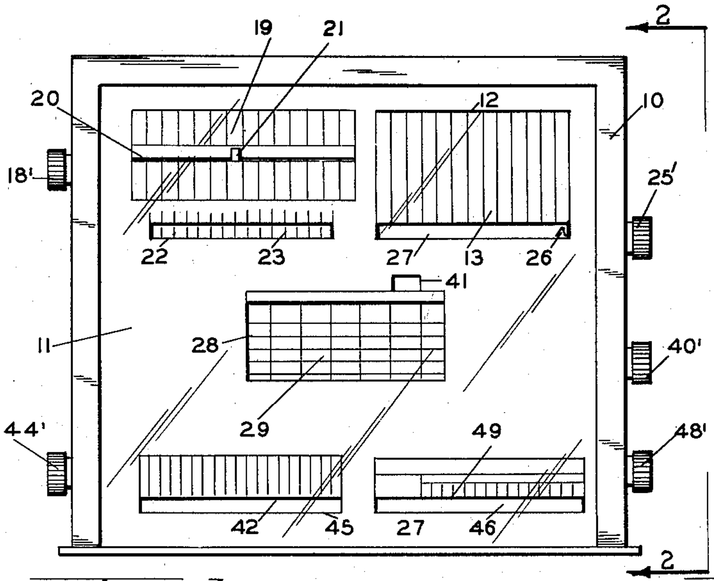
Fig. 1 is a front elevation of my entire device, the notation or printing on the front face of the same being merely indicated, without being actually shown, due to the small size of the figure.
Figure 2:
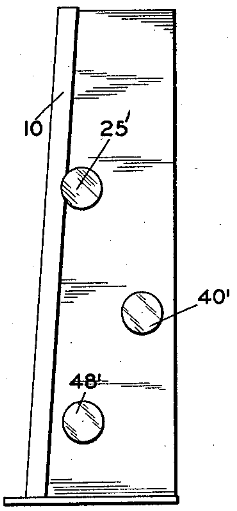
Fig. 2 is a side elevation of the device viewed from line 2—2 of Fig. 1.

Referring first to Figs. 1 to 4 inclusive, my perpetual calendar is mounted in a suitable housing, indicated in general by the reference character 10, which may be made with any desired exterior design and which should have a suitable base in order to support the entire device in an upright position on a desk, table or stand. Preferably a plate of glass or other suitable transparent material serves as the outer front wall for the housing and thus protects the face 11 of the calendar immediately behind it.

The face 11 of the calendar is formed with several windows, slots or similar apertures, through which portions of adjustable charts are visible or in which indicators appear as guides for adjusting the charts as hereinafter explained.

Figure 10:
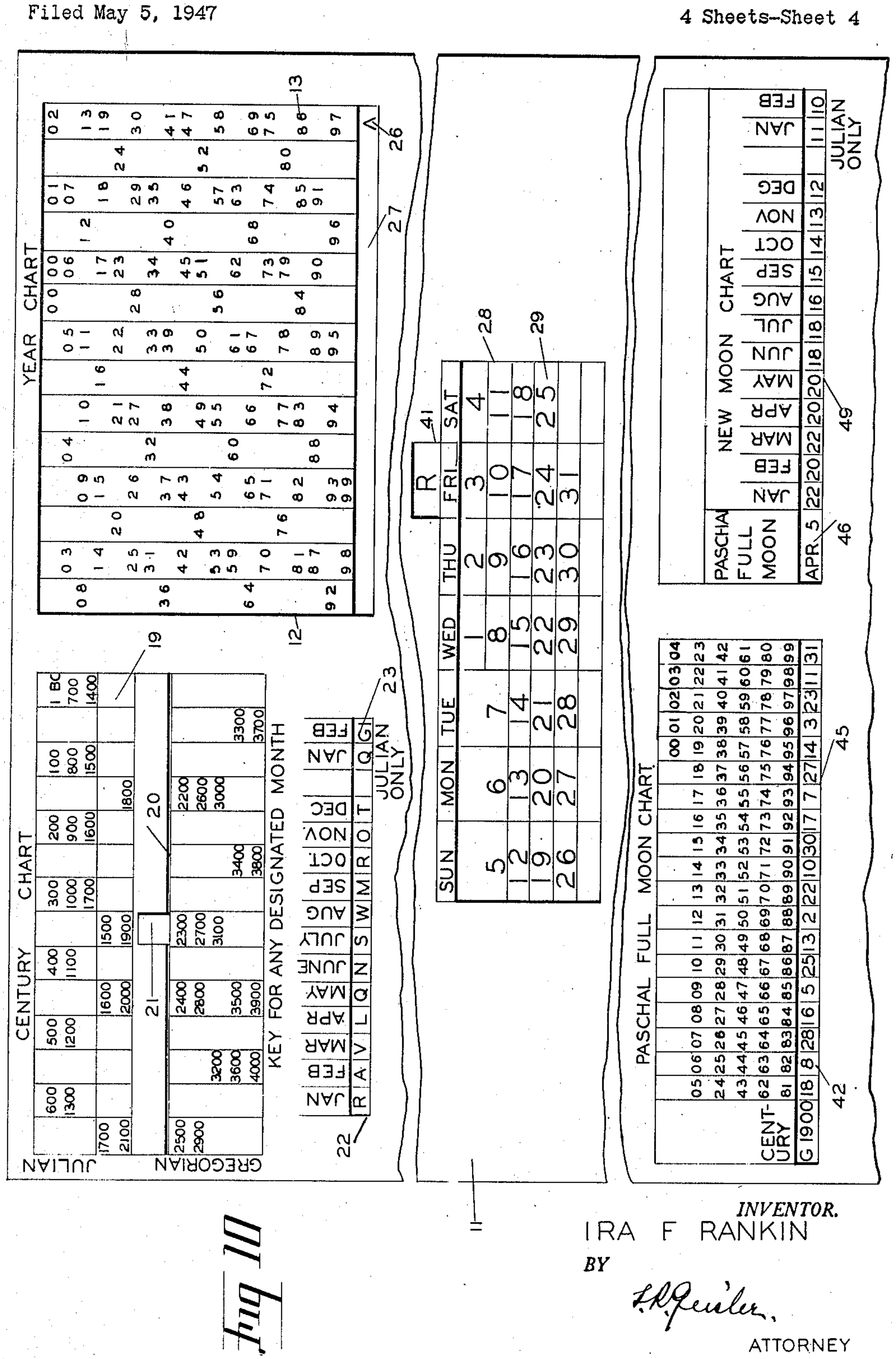
Fig. 10 is a front elevation of my device, drawn to a larger scale, showing in detail the data and figures appearing on the front face and showing data appearing in the windows or openings of the front face set for the month of January 1947, by way of illustration.

One of these windows 12 bears the caption "Year-Chart." (See also Fig. 10.) A movable chart 13, which I designate as the year-chart, is so arranged as to appear in this window 12. The chart 13 is mounted on an endless belt 14 which is supported on a pair of drums 15 and 16. These drums 15 and 16 have vertical axes which are rotatably mounted on brackets attached to the side walls within the housing 10. One of these axes is connected to a drive cable 17 and the other end of this drive cable is attached to a stub shaft 18 mounted in and extending through a side of the housing. A knurled knob 18′ is secured to the outer end of the stub shaft 18 on the outside of the housing 10 so that the endless belt 14, and with it the chart 13, can be moved back and forth before the window 12 by manipulation of the knurled knob 18′.

Figure 5:
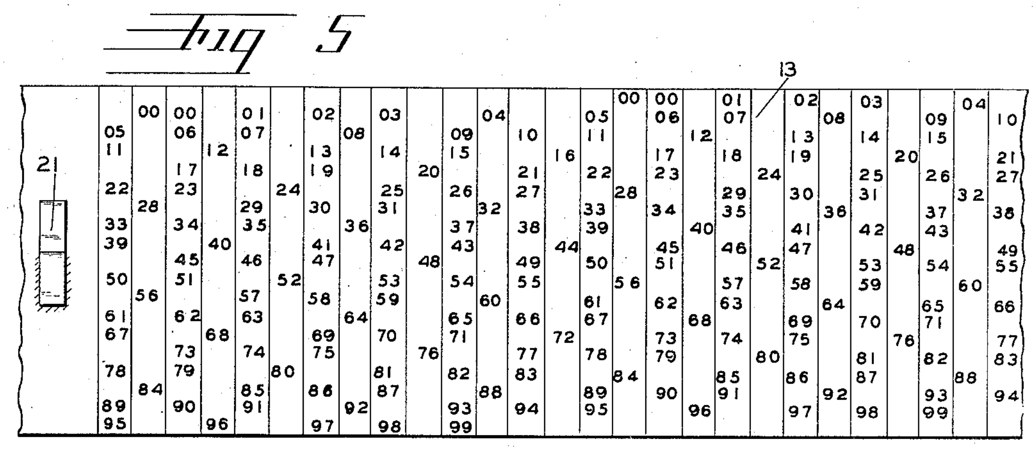
Fig. 5 is a fragmentary elevation of the chart and indicator carried on one of the endless belts employed in my device.

The year-chart 13 contains numbers from 00 to 99, thus numbers corresponding to any year within a particular century. The grouping of the numbers on chart 13 is shown in Fig. 5. The numbers are arranged in vertical columns, the numbers for leap years and the numbers for other years being placed in alternate columns. Preferably the window 12 is of such width that 14 of these columns of figures can appear at one time in the window. (See also Fig. 10.)

On the face 11, to the left of window 12, (as viewed in Fig. 10), a century-chart 19 is printed. This century-chart contains the numbers of the centuries up to and including 4000. The century numbers are arranged in vertical columns and the number of these vertical columns is the same as the number of vertical columns of the year-chart 13 visible at any one time in the window 12. Thus, as shown in Fig. 10, there are 14 columns in the century-chart and the maximum number of columns of the year-chart 13 which can be seen at any one time in the window 12 is also 14. It will further be noted that the century numbers in the century-chart 19 are arranged in two groups, one for the Julian or old style calendar, and one for the Gregorian or modern calendar.

Extending lengthwise along the century-chart 19 is a slit or narrow slot 20 through which an indicating element or finger 21 extends, this indicating element 21 being mounted on the endless belt 14. Thus as the knob 18′ is turned the indicating element 21 will be moved to the right or left along the century-chart 19 while at the same time the year-chart 13 is being moved in front of window 12.

Also located to the left of window 12, as viewed in Fig. 10, and spaced below the century-chart 19, is a narrow elongated window 22. Above this second window 22 the months of the year are printed on the face 11 of the calendar, as shown in Fig. 10. It will be noted that the months of January and February appear a second time after December above window 22. This arrangement is due to the fact that under the old Julian calendar the year began with March instead of January. Consequently there are 14 spaces for the months marked above the second window 22 and there are 14 columns in the century-chart 19, and the maximum number of columns visible in window 12 is also 14.

Figure 7:
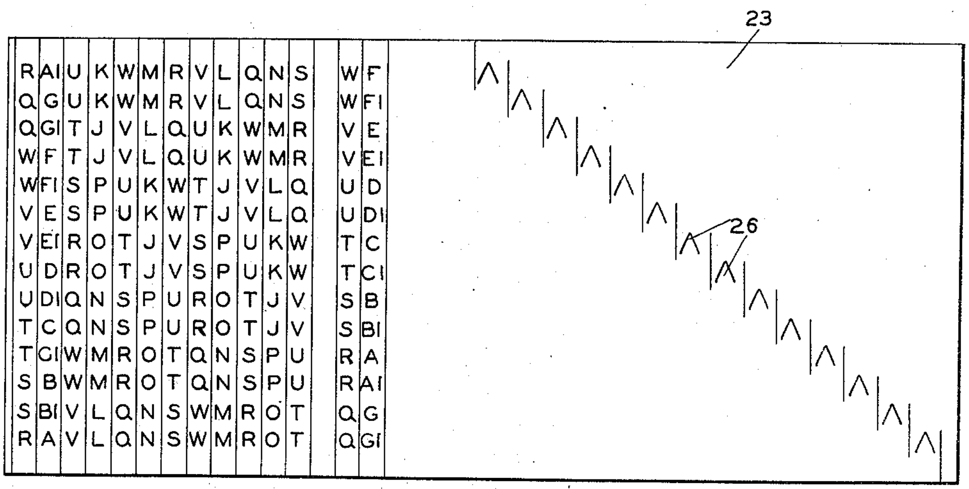
Fig. 7 is an illustration of the chart carried on the cylindrical surface of one of the rotatable drums.

A key-chart 23, detail of which is shown in Fig. 7, is mounted upon the cylindrical surface of a drum 24 (Fig. 4) carried on a horizontal axis 25 rotatably supported within the housing 10. One end of this drum axis extends through the side of the housing 10 and a knurled knob 25′ is attached to the outer end of this axis shaft to enable the drum 24 to be rotated as desired. As shown in Fig. 7 the key-chart 23 consists of a plurality of horizontal rows of key letters. Each row has 14 key letters, the spacing of the letters in each row corresponding to the marking of the 14 months above window 22. Thus rotation of the drum 24 will cause successive rows of key letters to appear in window 22. There are 14 of these rows on the key-chart 23 as shown.

It will also be noted from Fig. 7 that the key-chart 23 in addition contains a series of indicator marks 26, one for each row, arranged in stepped position. These indicator marks 26 are so placed on the chart 23 that as the drum 24 and chart 23 are rotated these indicator marks will appear consecutively in a horizontal slot 27 at the bottom of window 12 below the columns of numbers on the year-chart 13 appearing in window 12.

Figure 6:
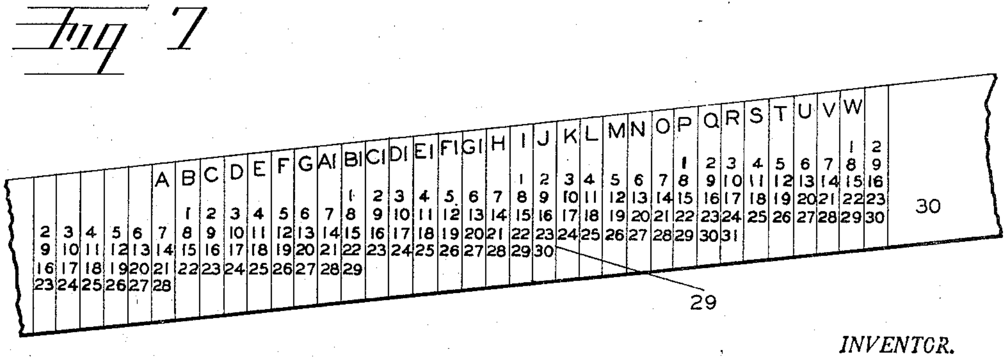
Fig. 6 is a similar fragmentary elevation of the chart carried by another endless belt.

A third window 28 is provided in the face 11 of my calendar in which window the desired monthly calendar-chart 29 is made to appear. The days of the week are marked on the face 11 of the calendar above the window 28, as shown in Fig. 10. The calendar-chart 29, which is shown in Fig. 6, is mounted on an endless belt 30. The belt 30 (Figs. 3 and 4), is supported on a pair of drums 31 and 32 carried on axes which are mounted for rotation in a pair of horizontal supporting brackets 33 and 34 attached to the inside of the housing 10. Pulleys 35 and 36 are attached to the axes of the drums 31 and 32 respectively. An endless cable 37 passes around these pulleys 35 and 36 and over a center pulley 38 and then around a drive pulley 39 secured to a horizontal shaft 40. One end of the horizontal shaft 40 extends through a wide wall of the housing 10 and a knurled knob 40′ is secured to the end of the shaft 40 outside of the housing 10. Thus manipulation of the knob 40′ will cause the endless belt 30 to move to the right or to the left and thus cause the calendar-chart 29 to move before the window 28. The endless belt 30 travels in a slightly oblique path. The axes of the supporting drums 31 and 32, while parallel, are not quite vertical, and one drum 31 is slightly higher than the other drum 32. The reason for having the endless belt 30 thus positioned for movement in a path which is slightly off the horizontal is due to the fact that the calendar-chart 29 consists of rows of figures in horizontal stepped arrangement and the top and bottom horizontal lines of that portion of the chart passing before window 28 must be within the top and bottom limits of the window.

The figures on the calendar-chart 29, in addition to being arranged in stepped horizontal lines, are also arranged in vertical columns and a key letter appears above each vertical column. A small aperture or window 41 in the face 11 of the calendar, located above window 28, is so arranged with respect to the mounting of the calendar-chart 29 that these key letters will appear, one at a time, in the aperture 41 as the calendar-chart 29 is moved.

The operation of the device, as thus far described, is as follows: let it be assumed that it is desired to show the month of January 1947 in the calendar window 28. First the knob 18′ is turned until the finger 21 is positioned in that column of the century-chart 19 in which the century number "1900" appears. This positioning of the finger 21 will also adjust the year-chart 13 with respect to window 12. Next the knob 25′ is turned until an indicator mark 26 is positioned below the column in window 12 in which the number "'47" appears, thus completing the year "1947." This will cause the key letters appearing in window 22 to be adjusted. The key letter corresponding to January (Gregorian calendar) in window 22 is now noted, thus key letter "R." Finally knob 40′ is turned until this key letter "R" appears in the aperture 41 on the face 11 of the calendar whereupon the desired monthly calendar will be clearly presented in window 28.

In this same way the calendar for any month of any year, from the year 1 to the year 4000 can be quickly obtained, either under the old Julian calendar or the Gregorian calendar. Thus by the turning of the three knobs 18′, 25′ and 40′ the day of the week on which any date in any year happens to fall can be quickly and easily ascertained.

In addition to having a calendar for any month of any year, and in addition to being able to ascertain the day of the week in which any particular event occurs in any year, it may also be desired to find the dates of the new moon and the date of Easter during any year. In order to make my calendar complete by also having this additional information easily and readily obtainable for the year in question I have provided two additional movable charts which I designate as the Easter or Paschal-Full-Moon-Chart and the New-Moon-Chart.

Figure 8:
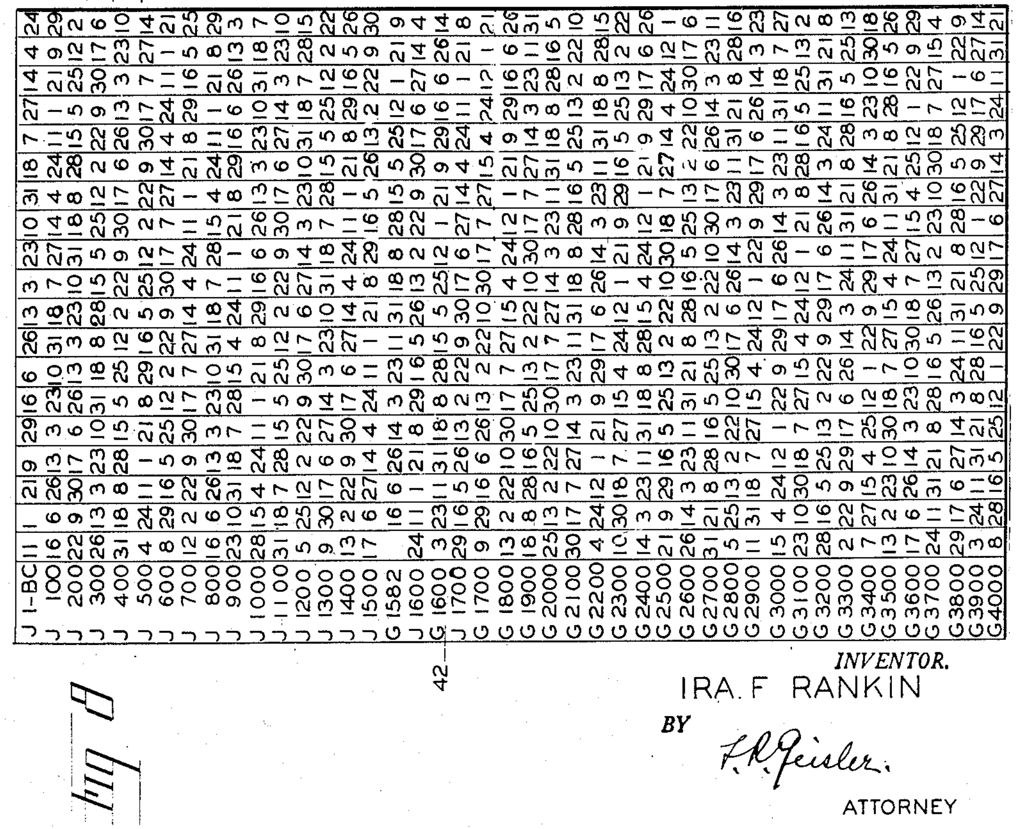
Fig. 8 is an illustration of the chart carried on the cylindrical surface of another rotatable drum.

The Paschal-Full-Moon-Chart 42 is shown in considerable detail in Fig. 8. This Paschal-Moon-Chart contains horizontal rows of date figures preceded by a century number. The chart is carried on the surface of a large drum 43 (Figs. 3 and 4), which is secured to a rotatably mounted horizontal shaft 44, one end of which extends through a side of a housing 10 and to the outside end of which a knurled knob 44′ is secured. The drum 43 and the chart 42 on its surface are so arranged that one row at a time of the figures on this chart will be visible through a narrow elongated window 45 in the face 11 of the calendar. It will be noted from Fig. 10 that vertical columns of figures are marked on the face of the calendar above the window 45, these figures indicating all the years within a century, and the number of these columns corresponds to the number of date figures in each horizontal row of chart 42. It will also be noted that a column at the extreme left above window 45 is designated "century" and that that column is directly above the century number appearing at the left of each horizontal row of date figures on chart 42.

Each of the date figures in each of the rows in chart 42 represents a date in March or April on which the Paschal Full Moon occurs. Since the Paschal Full Moon always occurs between March 20 and April 19 I have not considered it necessary to include "March" or "April" with each of the date figures in chart 42, although this could be done if preferred. However, for example, when the date figures 18, 8, 28 appear, it can be readily understood that these represent April 18, April 8, and March 28 respectively since the Paschal Moon can occur only between March 20 and April 19, as previously mentioned.

Since the figures on the calendar face 11 above window 45 represent the years within the century the date of the Paschal Full Moon in any year is obtained by turning the knob 44′ until the desired century number appears in window 45. Then the date of the Paschal Full Moon will appear under the column containing the year number. Thus, for example, it will be observed in Fig. 10 that the date of the Paschall Full Moon in 1947 is April 5. Since Easter is always the next Sunday after the Paschal Full Moon the exact date of Easter can be told by looking at the monthly calendar chart for the month of April for the same year.

Figure 9:
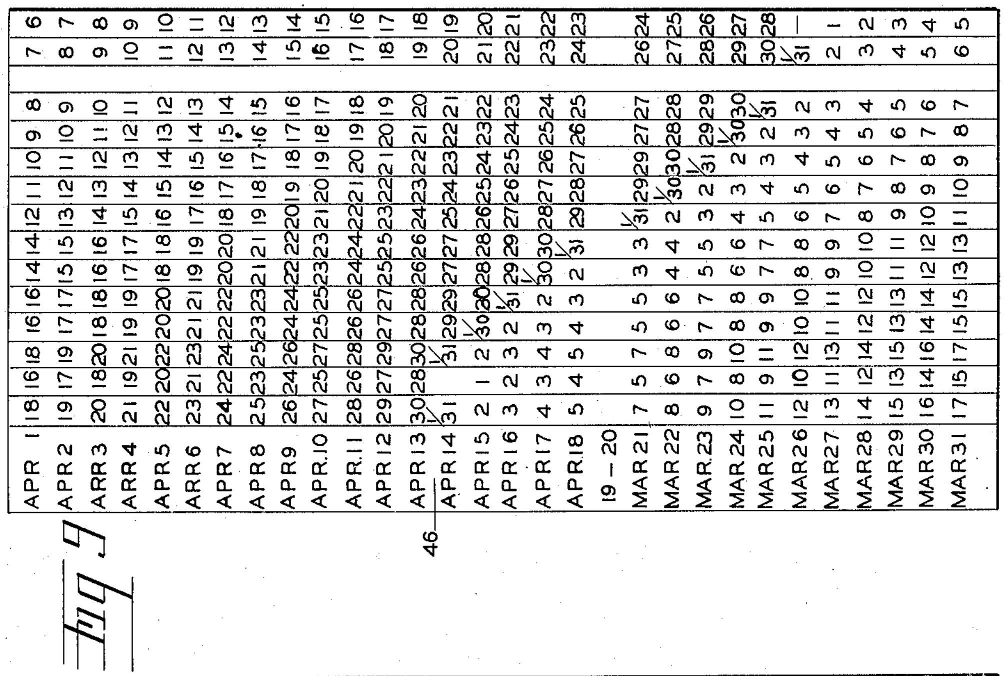
Fig. 9 is an illustration of the chart carried on the cylindrical surface of still another rotatable drum.

If it is desired to obtain the date of the new moon for any month of any year this information is obtained with my device with the aid of an additional chart 46, designated as the New-Moon-Chart, which is used in cooperation with the Paschal-Full-Moon-Chart 42. Detail of the New-Moon-Chart 46 is shown in Fig. 9.

Figure 4:
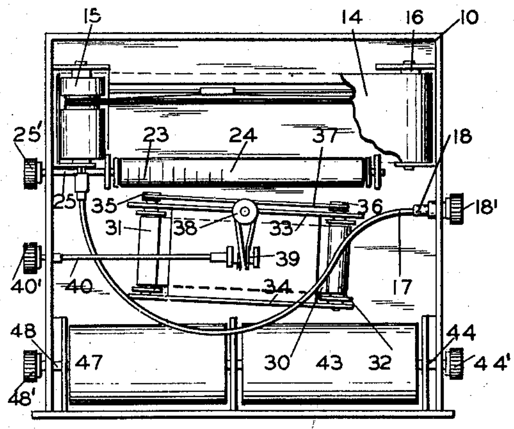
Fig. 4 is a similar rear elevation of the device, but with the rear wall of the housing removed and with portions of the mechanism including endless belts within the device, broken away for the sake of clarity.
Figure 3:
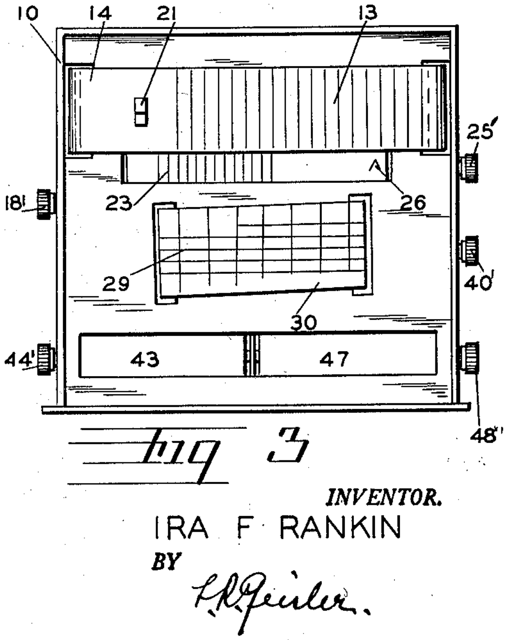
Fig. 3 is a front elevation of the device but with the front glass and front face of the calendar removed, and drawn to a slightly smaller scale.

This chart 46 is carried on the cylindrical surface of a drum 47 approximately the same size as drum 43 (Figs. 3 and 4). The drum 47 similarly is attached to a horizontally-mounted shaft 48, one end of which extends through a side of the housing 10 and has a knurled knob 48′ secured to its outside end.

The New-Moon-Chart 46 is visible through a narrow elongated window 49 and the chart 46 consists of horizontal rows of date numbers preceded by the date of the Paschal Full Moon. There are 14 date numbers in each row and above the window 49 the months of the year are marked. The months of January and February are repeated after December for dates in the Julian calendar, the same as with the window 22 previously described.

To find the date of the new moon in any month of any year all that is necessary is to turn knob 48′ until the date of the Paschal Full Moon for that year (previously obtained from chart 42 and window 45) appears in window 49. Then the new moon date for each month will appear under the corresponding month. With the date of the full moon given for every month the date of other phases of the moon can be figured at a glance since actually the subsequent phases, first quarter, full moon and last quarter, appear at subsequent intervals of approximately 7¼ days.

Thus with my complete device it is possible not only to obtain the calendar for any month of any year but also to ascertain the date of the Paschal Full Moon (and thus the date of Easter) for that year and finally the dates of the new moon (and consequently the dates of all other phases of the moon) for that particular year. All this data is quickly and easily obtained by very simple manipulation of the respective finger knobs on the outside of my device.

Various modifications could be made in the mounting and arranging of the charts in my perpetual calendar and in the mechanical means for operating the charts, without departing from the principle of my invention. It is not my intention to limit my invention to any particular mechanical construction otherwise than is set forth in the claims.

I claim:

1. In a perpetual calendar of the character described having means for selectively exhibiting any one of several monthly calendars each designated by a separate reference character, a housing, a front face on said housing, a century chart on said face showing century numbers arranged in vertical columns, a horizontal slot in said face extending along said chart, a window in said face, a movable year chart having numbers indicating years within a century arranged in vertical columns, the numbers indicating leap years being arranged in alternate columns on said movable chart, means for moving said chart past said window, the size of said window causing the same number of columns of said movable chart to be visible in said window at one time as the number of columns in said century chart, an indicating member attached to said movable chart, said indicating member sliding in said slot, a second window in said face, the months of the year marked in spaced position on said face along said second window, a movable key chart bearing the reference characters for said monthly calendars, means for moving said key chart past said second window, indicating means carried on said key chart, said indicating means appearing in said first window and movable, with the movement of said key chart, into registration with a column of year numbers appearing in said first window, whereby, when said indicating member of said first mentioned movable chart is moved into the proper century position and the indicating means on said key chart is then moved into registration with the column in said first mentioned window of the proper year number in the century, the reference characters for the proper monthly calendars will appear respectively in said second window.

2. In a perpetual calendar of the character described having means for selectively exhibiting any one of 28 monthly calendars each designated by a separate reference character, a housing, a front face on said housing, a century chart on said face showing century numbers arranged in 14 rows, a slot in said face extending along said chart transversely with respect to said rows, a window in said face, a movable year chart having numbers indicating years within a century arranged in rows, means for moving said chart past said window, the size of said window causing 14 rows of said movable chart to be visible in said window at one time, an indicating member attached to said movable chart, said indicating member sliding in said slot, a second window in said face, the months of the year marked in spaced position on said face along said second window, the total of said latter mentioned markings being 14 with the months of January and February appearing twice, a movable key chart bearing the 28 reference characters for said monthly calendars, means for moving said key chart past said second window, indicating means carried on said key chart, said indicating means appearing in said first window and movable, with the movement of said key chart, into registration with a row of year numbers appearing in said first window, whereby, when said indicating member of said first mentioned movable chart is moved into the proper century position and the indicating means on said key chart is then moved into registration with the row in said first mentioned window of the proper year number in the century, the reference characters for the proper monthly calendars will appear respectively in said second window.

IRA F. RANKIN.

REFERENCES CITED

The following references are of record in the file of this patent:

UNITED STATES PATENTS

| Number | Name | Date |
|---|---|---|
| 1,250,882 | House | Dec. 18, 1917 |
| 1,370,220 | Miller | Mar. 1, 1921 |
| 1,783,302 | Newton | Dec. 2, 1930 |